US009579736B2

(12) United States Patent
Sjoo

(10) Patent No.: US 9,579,736 B2
(45) Date of Patent: Feb. 28, 2017

(54) MILLING TOOL

(71) Applicant: SANDVIK INTELLECTUAL PROPERTY AB, Sandviken (SE)

(72) Inventor: Sture Sjoo, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 121 days.

(21) Appl. No.: 14/018,595

(22) Filed: Sep. 5, 2013

(65) Prior Publication Data

US 2014/0072376 A1    Mar. 13, 2014

(30) Foreign Application Priority Data

Sep. 7, 2012    (SE) ...................................... 1251005
Sep. 10, 2012   (SE) ...................................... 1251010

(51) Int. Cl.
*B23C 5/22*    (2006.01)
*B23C 5/20*    (2006.01)
(Continued)

(52) U.S. Cl.
CPC ........... *B23F 21/166* (2013.01); *B23F 21/146* (2013.01); *B23C 5/2204* (2013.01); *B23C 5/2208* (2013.01); *B23C 2200/0494* (2013.01); *B23C 2200/361* (2013.01); *B23C 2210/244* (2013.01); *Y10T 407/1725* (2015.01); *Y10T 407/23* (2015.01)

(58) Field of Classification Search
CPC .................. B23C 2210/165; B23C 2210/144; B23C 2200/0494; B23C 2200/362; B23C 2200/361; B23C 5/2204; B23C 5/2208; B23F 21/126; B23F 21/128; B23F 21/163; B23F 21/166; Y10T 407/1725; Y10T 407/1936; Y10T 407/23
(Continued)

(56) References Cited

U.S. PATENT DOCUMENTS 6,109,838 A * 8/2000 Riviere ........................ 407/36
6,227,772 B1 * 5/2001 Heinloth et al. .............. 407/113
(Continued)

FOREIGN PATENT DOCUMENTS

CN       1163174 A       10/1997
DE   19846060 A1 *    6/2000   ............... B23C 5/22
(Continued)

*Primary Examiner* — Daniel Howell
*Assistant Examiner* — Ryan Rufo
(74) *Attorney, Agent, or Firm* — Corinne R. Gorski

(57) ABSTRACT

The invention relates to a milling tool for gear milling. The tool body is equipped with tangentially mounted milling inserts having four cutting edges and two holes, only one of which is utilized for a fixing screw in two of totally four index positions. By locating a screw hole in the seat of the milling insert at a distance from the radial support surface of the seat that is greater than the distance between an individual hole and a distal end of the milling insert, a clamping force is provided by means of the inherent elasticity of the fixing screw. In such a way, the milling insert is pressed against the radial support surface. By means of a transversal eccentricity, the milling insert is also pressed against a tangential support surface in the seat. By means of this construction, the two holes in differently long milling inserts can be formed with equally large distances from distal ends. Thereby, one and the same tool body can be equipped with differently long milling inserts.

19 Claims, 9 Drawing Sheets

(51) Int. Cl.
*B23F 21/16* (2006.01)
*B23F 21/14* (2006.01)

(58) Field of Classification Search
USPC .............................................. 407/25, 48, 113
See application file for complete search history.

(56) References Cited

U.S. PATENT DOCUMENTS

| | | | |
|---|---|---|---|
| 7,168,895 B2* | 1/2007 | Koskinen | B23B 5/166 407/113 |
| 7,367,755 B2* | 5/2008 | Wurfels et al. | 407/113 |
| 7,713,005 B2* | 5/2010 | Rieth | 407/66 |
| 7,726,218 B2* | 6/2010 | Furuki | 82/100 |
| 8,834,076 B2* | 9/2014 | Gesell et al. | 407/113 |
| 2006/0056925 A1* | 3/2006 | Hecht et al. | 407/37 |
| 2009/0162155 A1 | 6/2009 | Wermeister | |
| 2011/0255925 A1* | 10/2011 | Yoshida | 407/51 |
| 2012/0076595 A1* | 3/2012 | Sågstrom et al. | 407/29 |
| 2012/0321397 A1* | 12/2012 | Sjoo | 407/29 |

FOREIGN PATENT DOCUMENTS

| | | | | |
|---|---|---|---|---|
| DE | 102005029053 A1 | | 1/2007 | |
| DE | 102012009097 A1 * | | 11/2013 | B23C 5/20 |
| EP | 0070489 A1 * | | 1/1983 | B23F 21/163 |
| JP | 11-019808 A * | | 1/1999 | B23B 27/16 |
| JP | 200566780 A | | 3/2005 | |
| WO | 2010007368 A1 | | 7/2010 | |
| WO | 2011136275 A1 | | 11/2011 | |

* cited by examiner

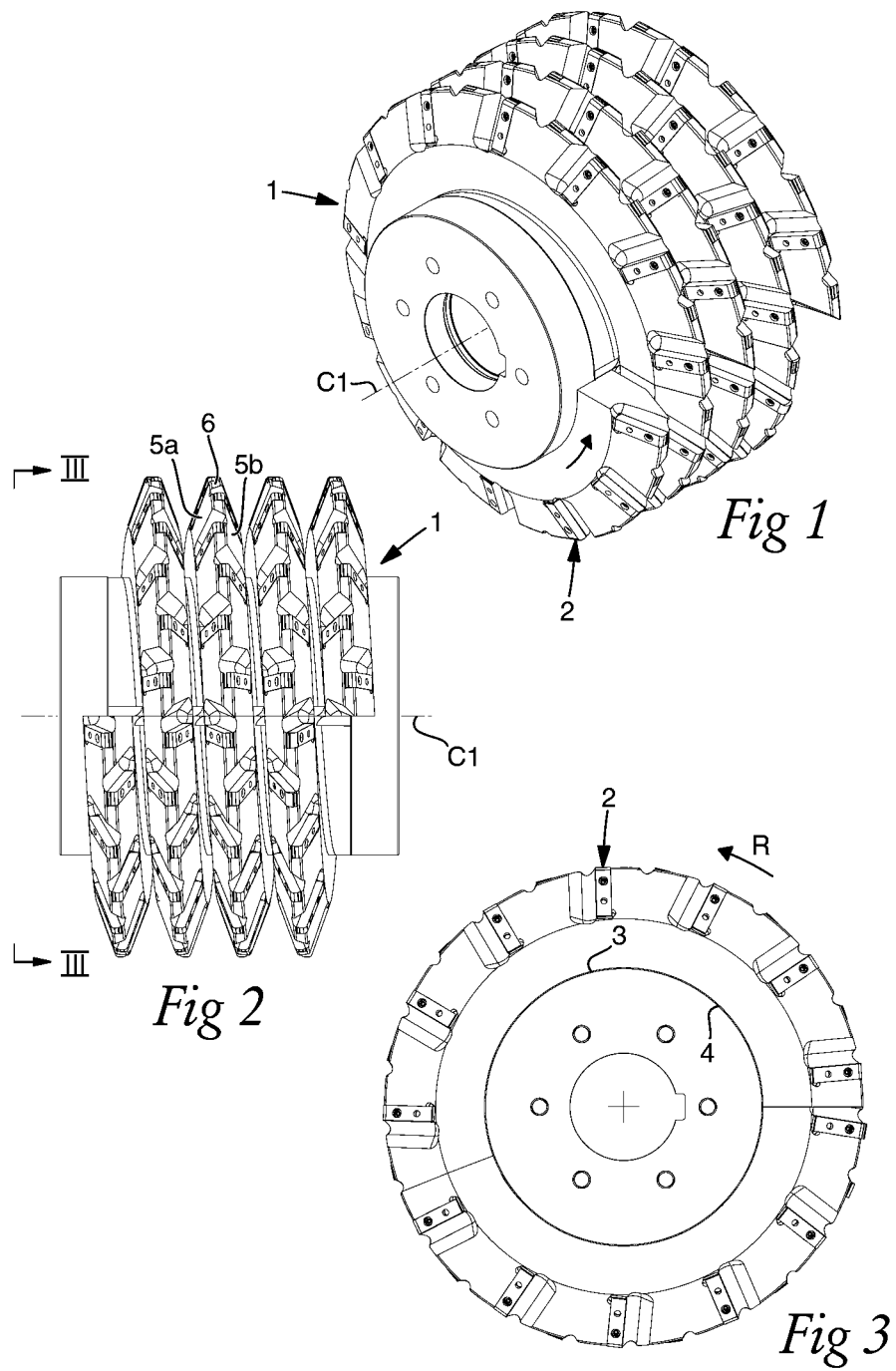

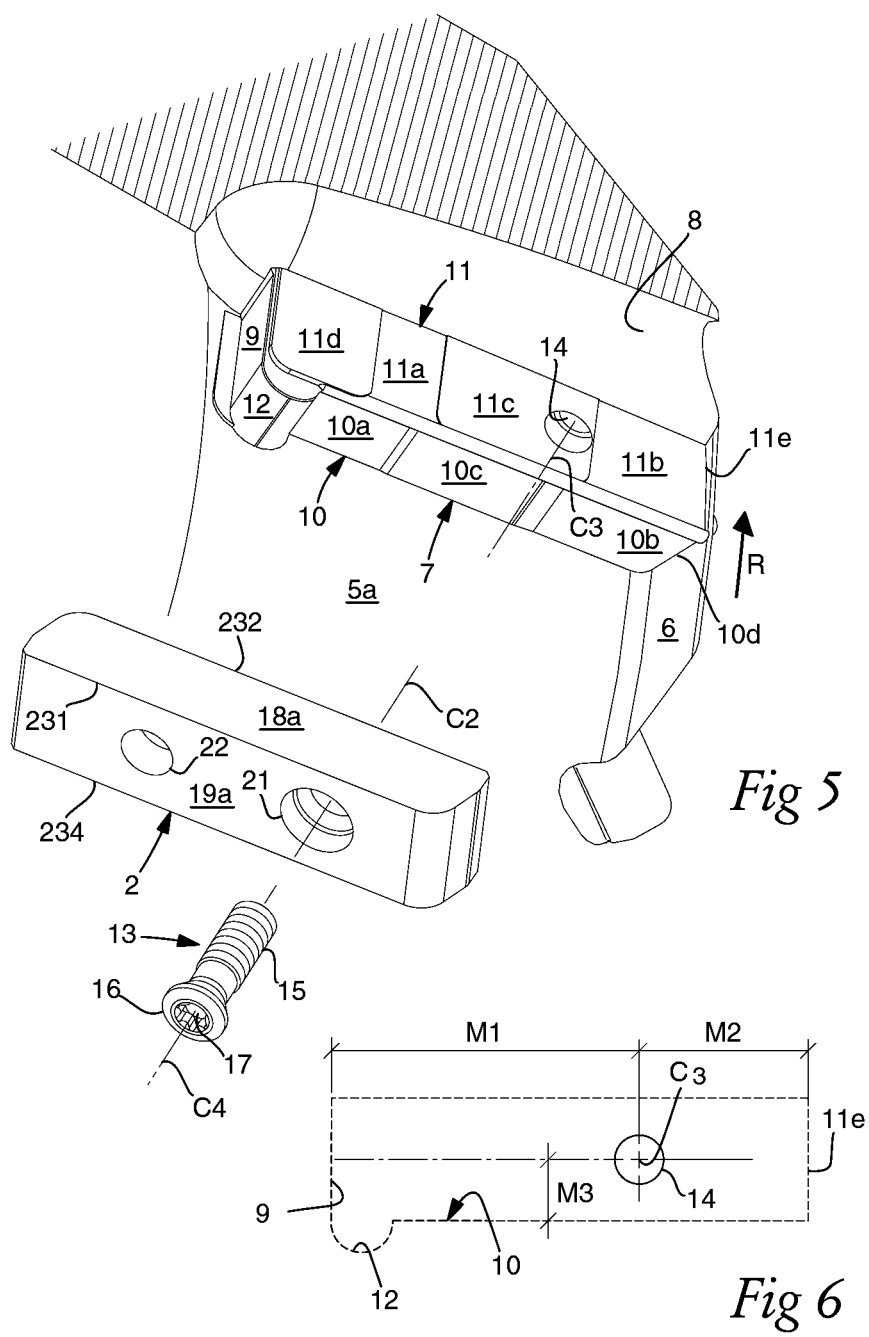

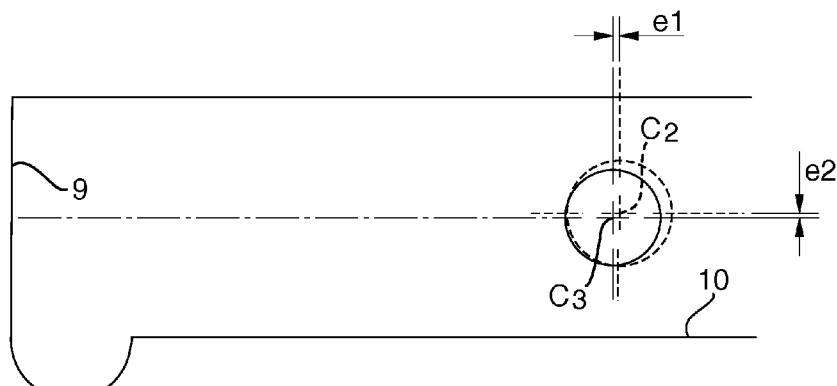
*Fig 17*
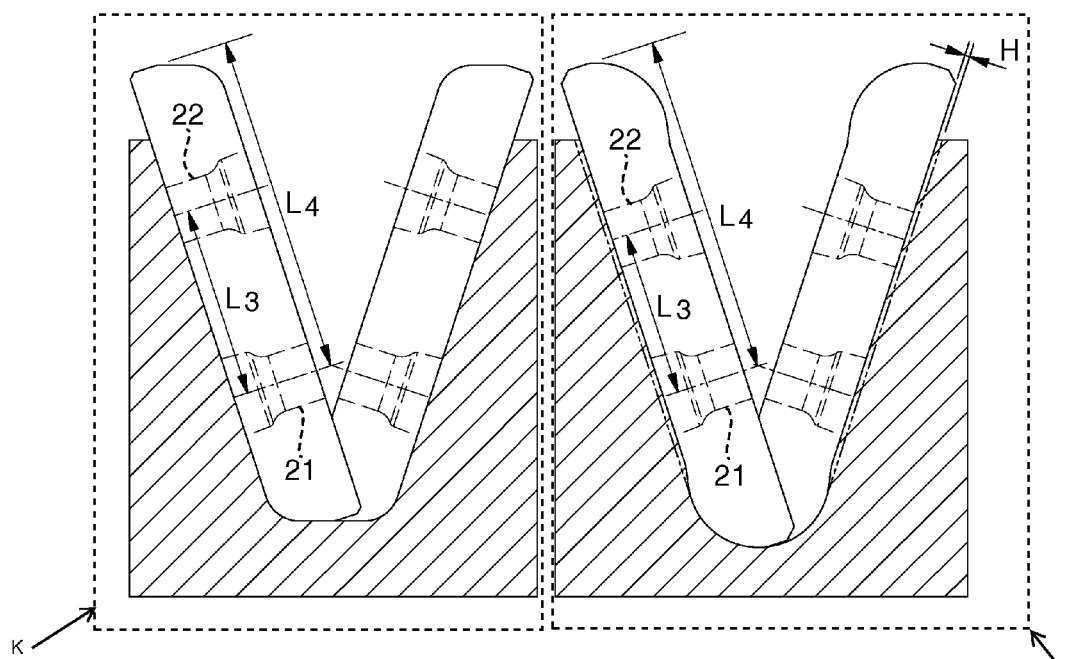
*Fig 18*   *Fig 19*

MILLING TOOL

RELATED APPLICATION DATA

This application claims priority under 35 U.S.C. §119 to SE Patent Application Nos. 1251005.3, filed on Sep. 7, 2012 and 1251010.3 filed on Sep. 10, 2012, which both the entirety thereof is incorporated herein by reference.

TECHNICAL FIELD OF THE INVENTION

This invention relates to a milling tool of the type that comprises on one hand a basic body, which is rotatable on a centre axis and includes a peripheral cam, which is tangent to an imaginary cylinder and delimited by two flank surfaces converging toward a common transition surface, in each one of which flank surfaces there are countersunk a plurality of tangentially spaced-apart seats, each one of which comprises a tangential support surface, a radial support surface, and an axial support surface in which a screw hole mouths that is radially spaced apart from the radial support surface, and on the other hand a plurality of milling inserts, which individually have an elongate basic shape and comprise two opposite and mutually parallel chip surfaces, two opposite and mutually parallel clearance surfaces, as well as a pair of opposite ends, and which include a through hole extending between the clearance surfaces, each one of the two chip surfaces transforming into connecting clearance surfaces via a pair of alternately usable cutting edges having identical shape, and the individual milling insert being fixed in an appurtenant seat by means of a screw that is tightened in the screw hole.

BACKGROUND OF THE INVENTION AND PRIOR ART

Milling tools of the type generally mentioned above are generally used for recessing slots or gaps in work pieces of metal (or composite material), e.g. with the purpose of providing cogs, spline bars, or the like. In this connection, the surface of the work piece, in which the milling is to be made, may be plane as well as round, e.g. circular or cylindrical as in cogwheels.

In one embodiment, the tool body, the basic body of the tool, has the shape of a circular plate or disc, the plane of which extends perpendicular to the centre axis. Such a tool can only mill out a single slot. With the purpose of providing simultaneous milling of several parallel slots, such tool bodies may be composed to a roll-like construction or long-edge milling cutter having a desired a number of plates situated parallel and close to each other. A disadvantage of the long-edge milling cutter as well as the simple slitting cutter is, however, that the machining becomes comparatively time-consuming and thereby expensive, more precisely as a consequence of the milling having to be carried out in steps in a number of reciprocating relative motions. Thus, in a first step, a fairly shallow slot is produced by the milling cutter being moved rectilinearly in a direction in relation to the workpiece (or vice versa), whereupon the tool is brought back to its initial position for a renewed milling operation, during which the slot is further deepened. These reciprocating motions are repeated until the milled slot has got the desired depth.

In order to make the machining more effective, hob cutters have recently been developed (by those skilled in the art also denominated "hobbing tools"). In such tools, the insert-carrying cams are running along a helical line that is tangent to an imaginary cylinder generated by a straight generatrix parallel to the centre axis. The helicoidal cam is running in a suitable number of turns at a predetermined, uniform pitch. Usually, the screw formation extends in at least four and at most eight turns. In certain embodiments, the tool body is made from one solid piece of material, usually of steel, but in other cases, the same may be composed of a plurality of separate segments that are formed so that the individual cams follow a common helical line. Irrespective of embodiment, such hob cutters are expensive to manufacture. The large investment cost of the tool body is, however, compensated more than enough by the efficiency of the milling cutter.

The tools in question may, independently of the different concrete embodiments of the basic bodies, be equipped with replaceable milling inserts of most varying types. A first variant is denominated full profile insert and includes only one cutting edge, which has a V-shape and can, in one and the same pass, generate the two opposite flanks as well as a gap bottom between two adjacent cogs (or spline bars and the like) to be made. A disadvantage of these milling inserts is, however, just the fact that they have only one usable cutting edge. Therefore, the total machining cost is severely burdened by the costs of the milling inserts.

Furthermore, two types of multi-edged milling inserts occur, viz. milling inserts having either two or four usable cutting edges. The two-edged milling inserts (see, for instance, WO 2011/136275 A1) are formed with one clearance surface and two opposite, identical chip surfaces, which transform into the common clearance surface via two identical cutting edges. When the milling insert is mounted in a seat on one side of the cam of the basic body, one of the cutting edges can remove chips. In order to enable use of the other cutting edge, the milling insert is moved over to a seat in the opposite side of the cam, the previously inactive chip surface being turned forward in the direction of rotation of the tool. In other words, the two-edged milling inserts are non-indexable in one and the same seat. It should also be mentioned that these milling inserts usually include two through holes for two fixing screws.

Four-edged milling inserts, which reduce the insert costs to an absolute minimum, are formed with not only one pair of identical chip surfaces, but also a pair of opposite and identical clearance surfaces, whereby the milling insert obtains four identical cutting edges. In such a way, the two cutting edges adjacent to a first chip surface, after indexing (turning 180°) of the milling insert, can be used in one and the same seat on one side of the cam. To utilize the two other cutting edges, the milling insert is moved over to a seat on the opposite side of the cam, wherein each one of the cutting edges along the second chip surface can work in the same way. Previously known, invertible milling inserts having four cutting edges are formed with a single centrally situated hole for the screw. This may extend either at a right or at an acute angle to the neutral plane of the milling insert.

The invention concerns itself exclusively with milling tools that are equipped with four-edged milling inserts of the type initially mentioned.

When previously known milling tools having four-edged milling inserts are used for the gear milling of, for instance, cogwheels, problems may arise as a consequence of the requirements of dimensional accuracy and surface smoothness of the cog flanks varying. In many cases, the requirements of dimensional accuracy are moderate, and therefore the precision that is obtained only by milling by the use of simple standard inserts is fully satisfactory. In other cases, the requirements are greater, involving that the cog flanks have to be ground or in another way finished after completed milling. In this connection, it is necessary, during the initial milling, to leave a certain (moderate) grinding allowance in the cog flanks. This is carried out by the use of so-called protuberance inserts. These are formed with bulge-like knobs or protuberances in the part of the milling insert where an otherwise plane clearance surface transforms into an end of the milling insert. The difference between a standard insert and a protuberance insert is seen in a comparison between FIGS. 18 and 19 in the appended drawings. In the standard insert according to FIG. 18, the cutting edge is straight up to the transition to an end, more precisely as a consequence of the clearance surface being plane up to said transition. The protuberance insert according to FIG. 19 differs from the standard insert not only in that the same includes a protuberance between the end of the milling insert and an otherwise plane clearance surface, but also in that the same is somewhat longer than the standard insert, more precisely to generate a gap bottom that is deeper situated between the cog flanks.

The fact that previously known standard inserts and protuberance inserts are differently long, in combination with the same including a single central hole to allow indexing, means that they cannot be used in one and the same tool body. Therefore, workshops that should be able to provide roughed as well as finished cog details have to invest in two separate tool bodies, which individually are extraordinarily expensive, in particular when it comes to hob cutters of a complicated shape.

Another disadvantage of previously known milling tools of the kind in question is based on the fact that the only hole included in the milling insert is centrally placed in the same, i.e., halfway between the two ends of the milling insert as well as the two chip surfaces thereof. If the hole is oriented perpendicular to the neutral plane of the milling insert—to be tightenable in a threaded screw hole oriented perpendicular to the axial support surface of the receiving seat—the tightening of the fixing screw is made more difficult in those cases (long-edge milling cutters and hob cutters, respectively) when the tool includes a plurality of cams situated close to each other. The central location of the hole then means that a key grip included in the head of the screw becomes particularly difficult to access. Considering that the tools include a considerable number of milling inserts, the requisite and fairly frequent insert replacements become time-consuming and cumbersome.

OBJECTS AND FEATURES OF THE INVENTION

The present invention aims at obviating the above-mentioned disadvantages of previously known milling tools and at providing an improved milling tool. Therefore, a primary object of the invention is to facilitate—and shorten the time for—replacement of the milling inserts, as well as provide conditions to, if required, be able to use differently long milling inserts in one and the same tool body. In particular, the tool body should be able to alternately receive short standard inserts as well as longer protuberance inserts. A further object is to simplify and make more effective the manufacture of the tool body and the milling inserts, in particular so far that the seats of the basic body as well as the appurtenant screw holes should be possible to be provided in an effective way at the same time as the milling inserts are rendered a strong design.

According to the invention, by placing the screw holes of the seat at a distance from the radial support surface that is greater than its distance to the radially outer end of the axial support surface, the same will be located near the periphery of the cam. Simultaneously, only the radially outer hole in the milling insert is utilized for the receipt of the screw that is tightened in the screw hole. In such a way, the screw and the key grip thereof will be easily accessible even if the cam is situated close to another cam, e.g. of a hob cutter. By furthermore locating the screw hole and the holes in the milling insert, respectively, in such a way that double eccentricities are provided, the inherent elasticity of the screw can be utilized to prestress the same, more precisely so that the same resiliently presses the milling insert against the radial support surface as well as the tangential support surface. Therefore, by means of this solution, conditions are provided so as to, if required, replace a certain type of milling insert, e.g. a short standard insert, by another type of milling insert, e.g. a longer protuberance insert. In such a way, one and the same basic body can be equipped with differently long milling inserts.

In one embodiment, the longitudinal eccentricity between the screw hole and a co-operating hole in the milling insert amounts to at least 0.10 mm. The transversal eccentricity should amount to 0.05 mm. By means of these minimum values of the respective eccentricities, a reliable fixation of the milling insert in the seat is guaranteed as a consequence of the same being pressed in close contact against the radial support surface as well as the tangential support surface.

In a preferred embodiment, the tool is made with a kit of milling inserts that includes differently long, although equally wide milling inserts, each longer milling insert of which has the two holes thereof located at a mutual distance that is smaller than the mutual distance between the two holes in a shorter milling insert. In such a way, the distance between an individual hole and a distal end of the milling insert can be selected so that the same becomes equally large in both (or all) types of milling inserts irrespective of the length thereof.

In a further embodiment, the distances between the two holes and proximal ends of the individual milling insert are on one hand equally large and on the other hand smaller than the mutual distance between the two holes. In such a way, the fixing screw will, in a tightened state, be located near the proximal end that is directed radially outward from the basic body.

In yet another embodiment, the two holes of the individual milling insert are formed with each a countersink intended for the receipt of a screw head, one of which countersinks opens in one of the clearance surfaces and the other one in the opposite clearance surface. In such a way, a screw head can in its entirety be located in the countersink, and thereby be protected by the milling insert when the tool is active in a machining operation.

In one embodiment, it applies that a first hole and a second hole mouth in the clearance surface of the milling insert, the first hole having a greater mouth in the clearance surface than the second hole. In such a way, the milling insert retains good strength in the material portion against which the screw head is pressed upon the tightening of the screw. In such a way, also the risk of chips and dirt entering the hole that does not have a screw inserted decreases. In such a way, also the risk of incorrect mounting decreases, in case the first hole has a greater mouth in the form of a countersink.

In one embodiment, at the chip surface of the milling insert, two diagonally opposite analogously formed arched part edges are formed. In such a manner, the milling insert is especially suitable to machine certain cogs.

In one embodiment, the pairs of opposite ends of the milling insert are parallel. In such a manner, the radial support for the milling insert is similar irrespective of which end that abuts against the radial support surface.

In one embodiment, the two holes of the milling insert are formed so that their respective centre axes are situated in a symmetry plane situated halfway between the chip surfaces of the milling insert. In such a manner, the possibility of forming a milling insert with four usable cutting edges is improved.

In one embodiment, at an end of the milling insert, the arched part edge is primarily situated on the same side of the neutral plane as the countersink that is situated closest to said end. In such a manner, it is guaranteed that the active arched cutting edge line is located in such a way that good machining can be carried out.

In one embodiment, each seat comprises only one screw hole. This entails a less costly manufacture of the basic body.

The invention according to a second aspect may be realised with an insert kit of differently long milling inserts, which individually have an elongate basic shape and comprise two opposite and mutually parallel chip surfaces, two opposite and mutually parallel clearance surfaces, a pair of opposite ends, as well as two holes, which holes extend continuously between the clearance surfaces, each one of the two chip surfaces transforming into connecting clearance surfaces via a pair of alternately usable cutting edges having identical shape. The insert kit is such that the same comprises two sets of differently long, although equally wide milling inserts, each longer milling insert of which has the two holes thereof located at a mutual distance (L3) that is smaller than the mutual distance (L3) between the two holes (21, 22) in a shorter milling insert, a distance (L4) between the respective holes (21, 22) and the distal end thereof being equally large for a longer milling insert as well as for a shorter milling insert. The advantage of this is that differently long milling inserts can be mounted in one and the same insert pocket, which eliminates the need of double tool sets.

In embodiments of the insert kit, the individual milling insert included in the insert kit may contain one or more features of the milling insert included in the tool described above.

BRIEF DESCRIPTION OF THE APPENDED DRAWINGS

In the drawings:

FIG. 1 is a perspective view of a hob cutter, which is an example of a milling tool according to the invention.

FIG. 2 is a side view of the tool according to FIG. 1.

FIG. 3 is an end view III-III in FIG. 2.

FIG. 5 is a further enlarged perspective exploded view showing an individual seat in the basic body of the tool, an individual milling insert, more precisely in the form of a standard insert, as well as a fixing screw for fixing the milling insert in the seat.

FIG. 6 is a schematic picture of dimensions.

FIG. 17 is a schematic illustrating how a hole in the mounted milling insert is eccentric in relation to a screw hole in the seat.

FIG. 18 is a schematic showing how two co-operating standard inserts mill out a gap between two adjacent cogs.

FIG. 19 is an analogous picture showing two protuberance inserts under the same conditions.

DETAILED DESCRIPTION OF AN EMBODIMENT OF THE INVENTION

Figure 4:
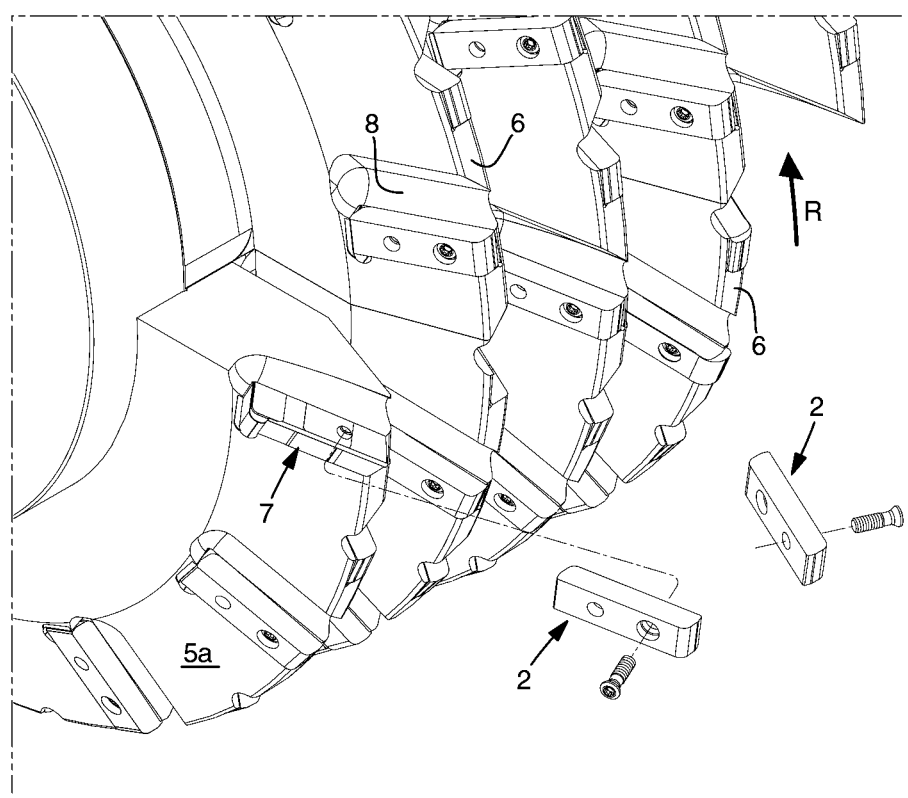
FIG. 4 is a partial, perspective exploded view on an enlarged scale showing a number of seats and milling inserts, two of which are shown exploded away from the appurtenant seats.

In FIGS. 1-3, an example is shown of a milling tool according to the invention, more precisely in the form of a hob cutter, which includes a basic body in its entirety designated 1, as well as a plurality of replaceable milling inserts 2. The basic body 1 is rotatable on a centre axis C1 and includes a central core 3 as well as a peripheral cam or ring 4. In the example shown, the cam 4 is composed of a plurality of separate segments, which are mounted outside the core 3 (by those skilled in the art such tools are, therefore, denominated "segment hobs"). The radially outer part of the cam 4 includes two flank surfaces 5a, 5b, which converge toward a common peripheral transition surface 6, involving that the outer part of the cam is cross-sectionally V-shaped. Characteristic of hob cutters is that the cam is running in a helicoidal formation on the centre axis C1, more precisely at a uniform pitch. The number of turns of the screw formation should in practice be within the range of 4-8. It should in addition be mentioned that the transition surface 6 of the cam is tangent to an imaginary cylinder that is defined by a straight generatrix parallel to the centre axis C1.

In this connection, it should furthermore be pointed out that the basic body 1 shown also may be made from one solid piece of material instead of from the described, separate components.

Reference is now made to FIG. 4, which illustrates how the milling inserts 2 is mounted in seats 7, which are countersunk in each one of the two opposite flank surfaces 5a, 5b. The seats, which are countersunk in one and the same flank surface (e.g. 5a), are tangentially spaced-apart, suitably at a uniform spacing, the seats in the opposite flank surface (5b) being placed between the first-mentioned ones, suitably halfway between the same. The radially outer end portions of the milling inserts 2 protrude somewhat from the peripheral transition surface 6 of the cam and overlap each other to together generate a bottom in the gash to be generated. In the area in front of each seat 7, as viewed in the direction of rotation R of the tool, there is also a chip channel 8 countersunk in the flank surface.

Reference is now made to FIG. 5, in which it is seen that the individual seat 7 is delimited by three support surfaces, viz. a radial support surface 9, a tangential support surface in its entirety designated 10, as well as an axial support surface generally designated 11. In this case, the tangential support surface 10 includes two plane part surfaces 10a, 10b, which are situated in a common plane and mutually separated by a countersunk valley surface 10c. In an analogous way, the axial support surface 11 includes two plane surfaces 11a, 11b that are mutually separated by a countersunk valley surface 11c. Between the inner part surface 11a and the radial support surface 9, there is also a countersink 11d, the purpose of which is described in more detail below. Between the inner part surface 10a of the tangential support surface 10 and the radial support surface 9, an arched clearance surface 12 is also formed. The two planes, in which the part surfaces of the axial and tangential support surfaces are situated, form a right angle with each other. In addition, all three support surfaces 9, 10, 11 are placed in such a way in the basic body that the received milling insert is located in negative tipping-in positions (tangentially as well as radially) so as to provide, in the usual way, the requisite clearances between the milling insert and the surfaces generated in a workpiece.

Fixation of the milling insert 2 in the seat 7 is made by means of a screw 13 that is tightened in a threaded hole 14, which henceforth is denominated screw hole and which mouths in the axial support surface 11, suitably in the valley surface 11c between the part surfaces 11a, 11b against which the milling insert is pressed by the screw. The centre axis of the screw hole 14 is designated C3, while the centre axis of the screw 13 is designated C4. The screw 13 is suitably manufactured from steel having a certain inherent elasticity, and includes on one hand a male thread 15 and on the other hand a head 16 having a key grip 17.

The tangential support surface 10 includes a radially outer end 10d in the form of a boundary line to the transition surface 6. In an analogous way, the axial support surface 11 extends from an inner end adjacent to the radial support surface 9 to a radially outer end 11e, likewise in the form of a boundary line to the transition surface 6. In the schematic illustration in FIG. 6, M1 designates the radial distance between the hole 14 and the radial support surface 9. Furthermore, M2 designates the radial distance from the screw hole 14 to the outer end of the axial support surface such as this is represented by the boundary line 11e. The transversal distance between the screw hole 14 and the tangential support surface 10 is designated M3. It should be pointed out that all distances relate to the centre axis C3 of the screw hole.

Figure 7:
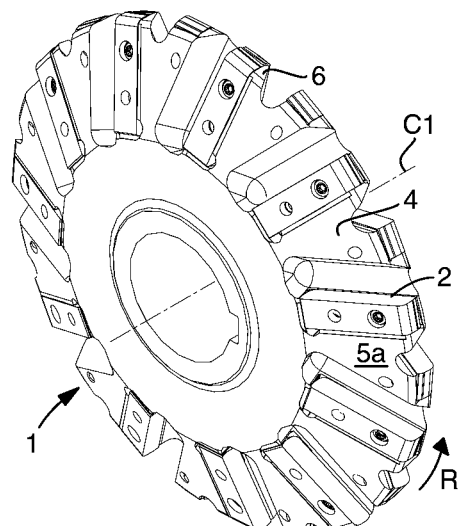
FIG. 7 is a perspective view of another example of a milling tool according to the invention, viz. a single slitting cutter.
Figure 8:
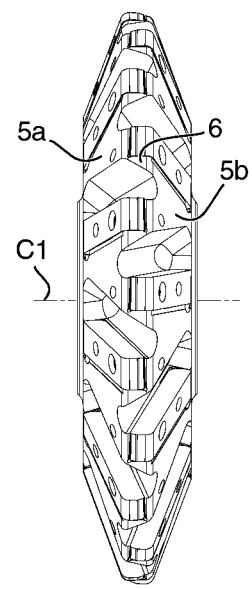
FIG. 8 is a side view of the tool according to FIG. 7.
Figure 9:
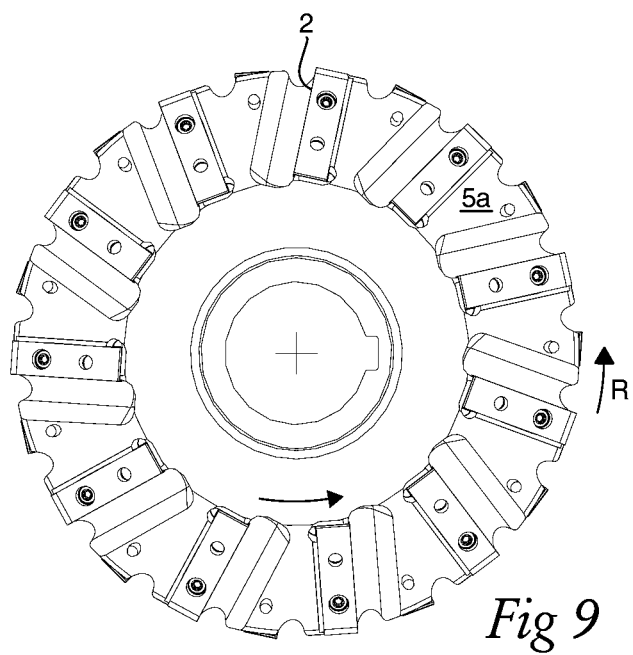
FIG. 9 is an end view of the same tool.

To make clear that the invention is applicable also to other milling tools than hob cutters, in FIGS. 7-9, an example is shown of a simple, disc-shaped milling cutter. In this case, the peripheral cam 4, which is equipped with the milling inserts 2, is circular instead of helicoidal, more precisely by the fact that the peripheral transition surface 6 between the two opposite flank surfaces 5a, 5b is situated in a plane that extends perpendicular to the centre axis C1. In respect of the milling inserts and the seats in which these are fixed, the slitting cutter according to FIGS. 7-9 does however not differ from the hob cutter according to FIGS. 1-3. As mentioned above, the single slitting cutter may be combined with other slitting cutters while forming a long-edge milling cutter in which the cams 4 are situated close to each other.

Figure 10:
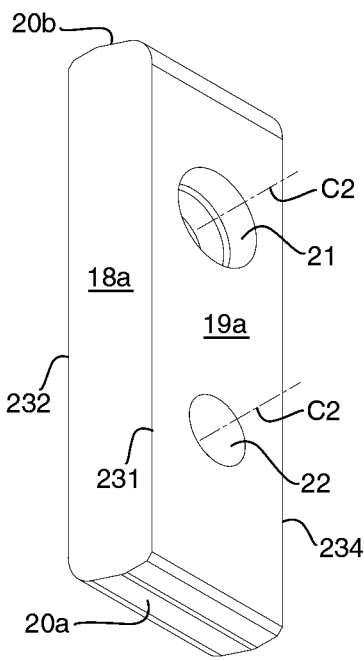
FIG. 10 is a perspective view of a milling insert in the form of a standard insert included in an insert kit.
Figure 11:
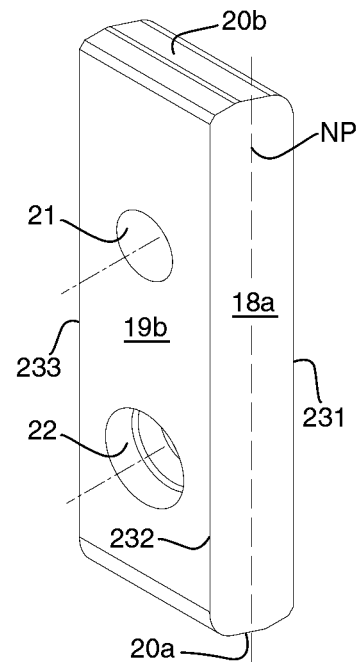
FIG. 11 is a similar perspective view showing the milling insert from the opposite side.
Figure 12:
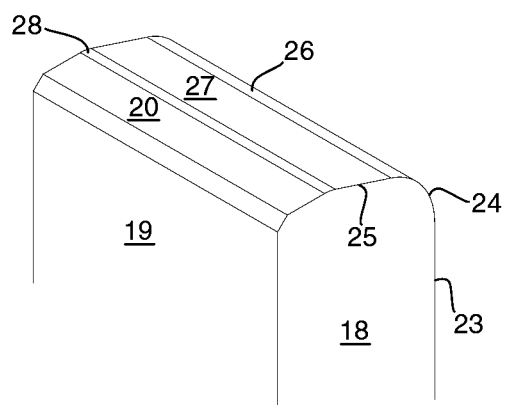
FIG. 12 is a partial, enlarged perspective view showing the shape of one end of the milling insert.

Reference is now made to FIGS. 10-16, which illustrate the nature of a milling insert, which henceforth is denominated standard insert, and which is intended for gear milling in such applications where the requirements of dimensional accuracy of the generated cog flanks are moderate. The milling insert in question has an elongate basic shape and comprises two opposite and mutually parallel chip surfaces 18, two opposite and mutually parallel clearance surfaces 19, as well as two opposite ends 20, which are represented by two plane and mutually parallel surfaces, which are oriented at right angles to the chip surfaces as well as the clearance surfaces. For the purpose of separating the surfaces 18, 19, 20 in functional respect, the same are in FIGS. 10 and 11 provided with the suffixes a and b, respectively. Between the clearance surfaces 19a, 19b, two through holes 21, 22 extend, the centre axes of which are designated C2. The transitions between the pairs of opposite chip and clearance surfaces form in total four cutting edges generally designated 23. The major part of the individual cutting edge 23 is straight as a consequence of the meeting surfaces 18, 19 being plane. Adjacent to one end of the milling insert, however, two part edges 24, 25 are included (see FIG. 12), the first-mentioned one of which is arched and the other one straight, more precisely as a consequence of an arched part surface 26 as well as a plane one 27 being formed between the clearance surface 19 and the individual end surface 20 of the milling insert. Between the surfaces 20 and 27, there is also a diminutive radius transition 28. In FIGS. 10 and 11, the reference designation 23 of the four cutting edges has been supplemented with the numerals 1, 2, 3 and 4 for the purpose of distinction.

Figure 14:
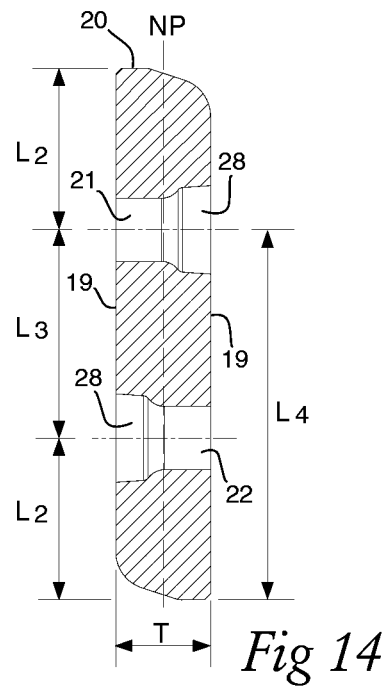
FIG. 14 is a cross section taken along line XIII-XIII of FIG. 13.
Figure 15:
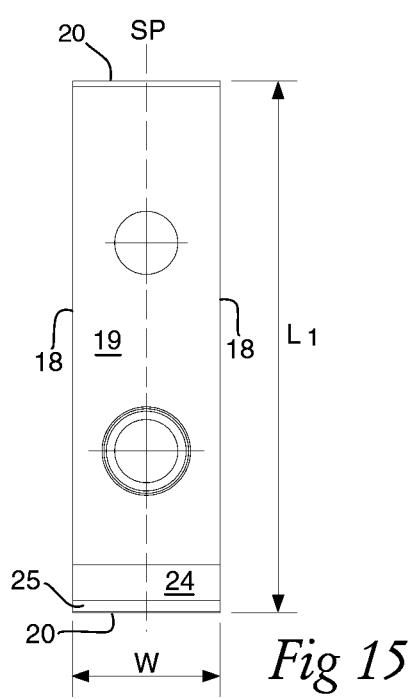
FIG. 15 is a planar view showing the opposite side of the milling insert.
Figure 16:
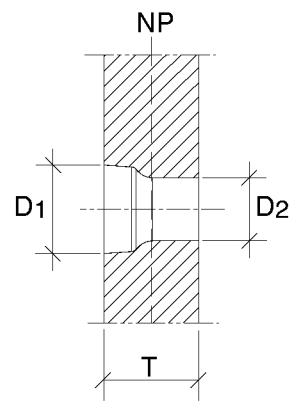
FIG. 16 is a cut cross section showing the dimensions of a hole included in the milling insert.
Figure 20:
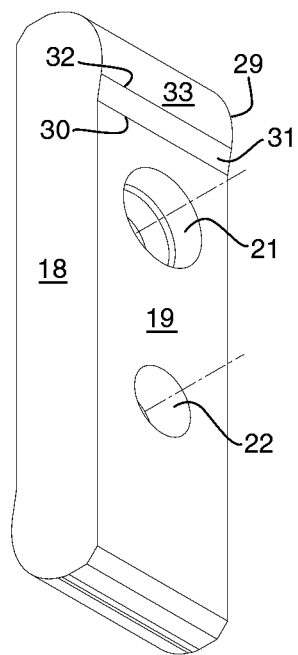
FIGS. 20-25 are a series of pictures corresponding to FIGS. 10-16 illustrating the shape of a protuberance insert included in the same kit as the standard insert.
Figure 21:
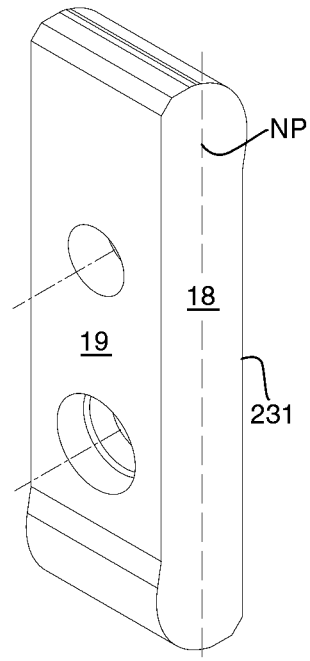
Figure 22:
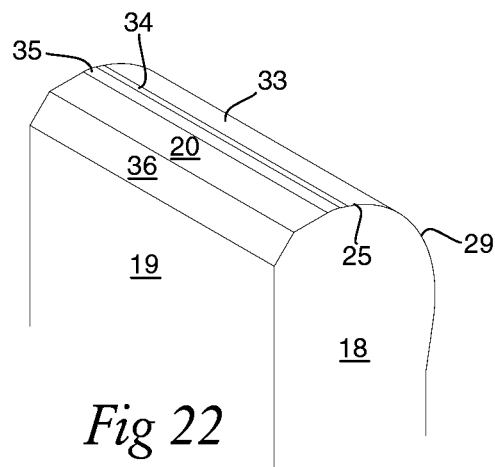
Figure 23:
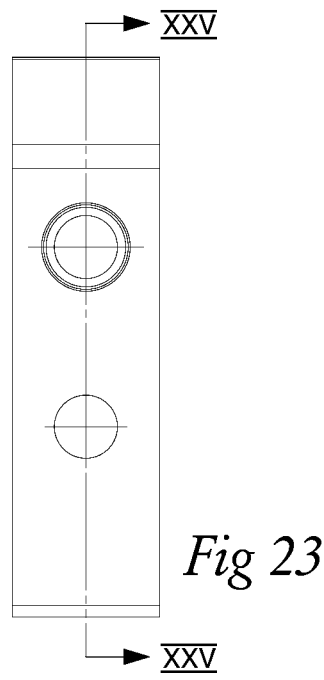
Figure 24:
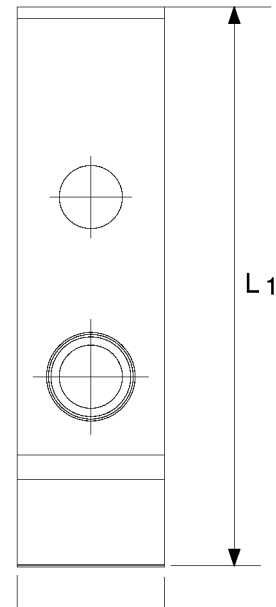
Figure 25:
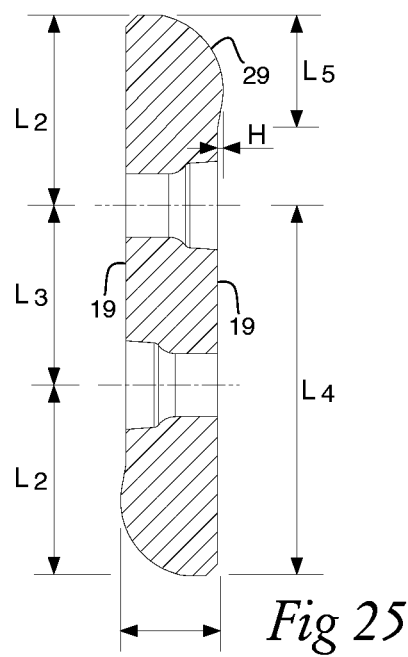

In FIGS. 11, 14, and 16, NP designates a neutral plane situated halfway between the two clearance surfaces 19. In FIG. 15, SP designates a symmetry plane situated halfway between the chip surfaces 18.

In a first operative state (see again FIG. 5) in an arbitrary seat 7 in one flank surface of the cam, e.g. 5a, the clearance surface 19a of the milling insert is assumed to be facing outward, the fixing screw 13 being applied in the hole 21 and the chip surface 18a facing forward in the direction of rotation R of the tool, involving that the cutting edge 23₁ is active. When this cutting edge 23₁ has been consumed, the milling insert can be indexed in one and the same seat 7, more precisely by being turned so that the clearance surface 19b faces outward and the hole 22 is located flush with the threaded hole 14 of the seat. In this way, the previously inactive cutting edge 23₂ will assume an active state in which chips are removed against the chip surface 18a. When also the cutting edge 23₂ has been worn out, the milling insert can be moved to a seat included in the flank surface 5b that is situated on the opposite side of the cam 4. In said seat, the two cutting edges 23₃ and 23₄ may alternately be utilized by the milling insert being indexed in the described way.

Figure 13:
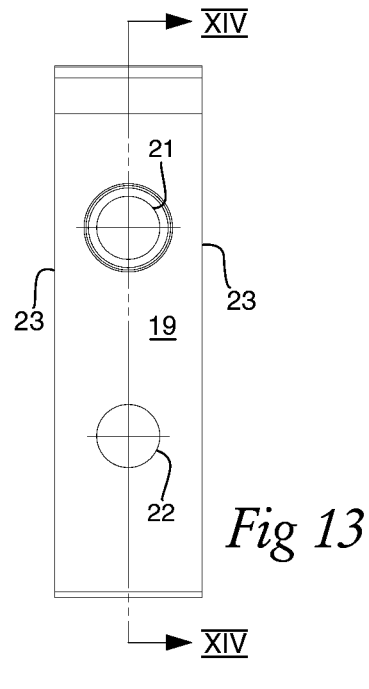
FIG. 13 is a planar view showing one side of the milling insert.

In FIGS. 13-15, it is seen that the total length L1 of the milling insert, between the two opposite end surfaces 20, is considerably greater than the width W thereof (in the example the ratio L/W is approx. 4). The distances between the holes 21, 22 and proximal ends are equally large and designated L2, while the mutual distance between the holes is designated L3. As seen in FIG. 14, L3 is greater than L2. In the example, the ratio L3/L2 amounts to approx. 1.33. Thus, in comparison with a single central hole, the individual hole 21, 22 is situated considerably closer to a (proximal) end of the milling insert. This means that the hole that receives a fixing screw is located comparatively near the periphery of the cam 4 (i.e., radially far out from the centre axis), something that significantly facilitates application of a key in the key grip 17 of the screw 13. In this connection, it should be pointed out that the holes 21, 22 include countersinks 28, one of which mouths in one of the clearance surfaces of the milling insert, while the other mouths in the opposite clearance surface, as clearly seen in FIG. 14. The countersinks 28 have the purpose of housing the screw head 16, when the milling insert is fixed. More precisely, the individual countersink 28 is so deep that the screw head 16 in its entirety is located somewhat below the plane in which the clearance surface 19 is situated. By forming the individual hole with only one countersink, the strength of the milling insert is optimized so far that the amount of material (e.g. cemented carbide) behind the tightened screw head becomes great in spite of the thickness T of the milling insert being limited. More precisely, the depth of the countersink 28 is smaller than half of the thickness T of the milling insert.

For guaranteeing an accurate positioning and reliable fixation of the milling insert in the appurtenant seat, so-called spring biased screws are used. More precisely, the screw 13 is utilized to press the milling insert not only against the radial support surface 9 but also against the axial support surface 11. This takes place by the distance (designated L4 in FIG. 14) between the hole, which receives the screw, and the distal end surface 20, which is pressed against the radial support surface 9, being selected somewhat greater than the distance between the radial support surface and the screw hole 14. In such a way, a longitudinal eccentricity e1 arises between the holes (see FIG. 17). When the screw is tightened in the screw hole, the inherent elasticity of the same will resiliently press the distal end surface of the milling insert against the radial support surface 9, at the same time as the co-operating threads clamp one clearance surface of the milling insert against the axial support surface 11. In addition, there is a transversal eccentricity e2 in order to, in an analogous way, resiliently press also the inactive chip surface against the tangential support surface 10 (already before cutting forces are applied to the milling insert).

In a prototype embodiment, the standard insert shown has the following concrete dimensions:

L1=50.56 mm
L2=15.38 mm
L3=19.80 mm
L4=35.18 mm (19.80+15.38)
D1=8.4 mm
D2=6.0 mm
T=9.0 mm
W=14.0 mm

Because the holes 21, 22 are placed with the centre axes thereof in the symmetry plane SP (see FIG. 15), the transversal distance between the individual hole and each chip surface 18 will, in this case, amount to 7.0 mm.

With simultaneous reference to FIGS. 6 and 17, it should be pointed out that the radial distance between the screw hole 14 and the radial support surface 9 of said prototype embodiment amounts to 34.83 mm. This means that the longitudinal eccentricity e1 will amount to 0.35 mm (35.18−34.83). Furthermore, the transversal distance M3 between the hole 14 and the tangential support surface amounts to 6.90 mm, involving that the transversal eccentricity e2 amounts to 0.10 mm (7.00−6.90). When the screw is tightened in the screw hole 14, the same will—thanks to its inherent elasticity—subject the milling insert to a force resultant that is directed approximately diagonally to the clearance surface 12. In such a way, the milling insert will be resiliently pressed against the radial support surface as well as the tangential support surface (at the same time as the tightening force of the screw of course presses one clearance surface of the milling insert against the axial support surface 11).

In a preferred embodiment of the tool according to the invention, the standard insert described above is included in an insert kit belonging to the tool, which in addition includes a protuberance insert of the type shown in FIGS. 20-25. This protuberance insert differs from the standard insert according to FIGS. 10-16 above all in that the same is longer than the standard insert, but also in that the design of the milling insert in connection with the ends thereof is different. In the protuberance insert, per se, there are also included pairs of opposite chip surfaces 18, clearance surfaces 19, and end surfaces 20. In this case, however, a bulge-like knob or protuberance 29 is formed in the area between the individual clearance surface 19 and an end surface 20. Thus, the plane clearance surface 19 extends up to a first boundary line 30, in which the same transforms into a comparatively narrow, concave transition surface 31, which in turn, via a second boundary line 32, transforms into a convex part surface 33. In its turn, surface 33 transforms into the end surface 20 via trivial transition surfaces 34, 35. For the sake of completeness, it should be mentioned that the end surface 20 transforms into an opposite clearance surface via a plane facet surface 36 (which also is present in the standard insert).

The level difference H (see FIG. 25) between the clearance surface 19 and the highest point of the protuberance 29 determines the grinding allowance that is provided by the protuberance. This is seen in FIG. 19, which illustrates how the protuberance insert during milling leaves a surface layer of the thickness H. As a consequence of the protuberance inserts being somewhat longer than the corresponding standard inserts, the same will mill out a slot or a gash, which may be made deeper and have a bottom with a round shape, in which a grinding tool may be housed so as to, by a concluding polishing operation, remove the surface layer left behind. In practice, the grinding allowance, i.e., the level difference H, may be within the range of 0.05-0.20 mm.

For allowing mounting of either a set of standard inserts or a set of longer protuberance inserts in one and the same basic body, e.g. in a hob cutter according to FIGS. 1-3, the mutual distance L3 (see FIG. 25) between the two holes 21, 22 in the longer protuberance insert is shorter than the corresponding distance L3 (see FIG. 14) between the holes in the shorter standard insert. By in this way reducing the distance L3 of a longer milling insert, the dimension L4 can be kept constant. For elucidating the same, below it follows a summary of the dimensions of the protuberance insert of one and the same prototype embodiment:

L1=53.28 mm
L2=18.10 mm
L3=17.08 mm
L4=35.18 mm

In the embodiment in question, the protuberance 29 has a longitudinal extension L5 of 10.70 mm.

From the above, it is seen that the distance L4, from the individual hole 21, 22 to a distal end of the milling insert, is equally large (35.18 mm) in both cases. Thus, by the invention, conditions are provided to, in one and the same basic or tool body, use two (or more) sets of milling inserts having different length. In this connection, it should be pointed out that the invention is based on the understanding that the individual milling insert can be fixed in a reliable way by means of only one screw. In other words, only one of the holes 21, 25 receives the screw, while the other is inactive in each index position. Not until after indexing (turning 180°), the second hole will actively receive a screw, while the first-mentioned one remains empty. The fixation becomes stable and reliable when it is made by means of a spring biased screw of the above described type, more precisely a screw that upon tightening presses the inactive clearance surface of the milling insert against the axial support surface of the seat at the same time as the above-mentioned (double) eccentricities between the hole in the milling insert and the threaded screw hole in the seat are selected so that the inner end surface of the milling insert as well as the inactive chip surface thereof are pressed against the radial support surface and tangential support surface, respectively, of the seat.

It should be axiomatic that the inactive protuberance 29 of the protuberance insert shown in FIGS. 20-25 can be housed in the countersink 11*d* between the part surface 11*a* of the axial support surface and the radial support surface 9, whereby the otherwise plane clearance surface 19 on the same side of the milling insert can be pressed in close contact with against the two force-absorbing, plane part surfaces 11*a*, 11*b*.

Feasible Modifications of the Invention

The invention is not limited only to the embodiments described above and shown in the drawings. Thus the invention may be applied to milling tools that make use of other types of tangentially mounted milling inserts than standard and protuberance inserts, provided that the milling inserts are differently long. Thus, in an insert kit belonging to the tool, milling inserts of more than two different types can be included. The holes in the milling insert may also be tilted so that their respective centre axis does not form a right angle with the clearance faces.

The invention claimed is:

1. A milling tool comprising:
   a basic body rotatable on a centre axis and including a peripheral cam having two flank surfaces converging toward a common transition surface, in each of the flank surfaces there is countersunk a plurality of tangentially spaced-apart seats, each of the plurality of seats including a radial support surface, a tangential support surface, and an axial support surface having a radially outer end and a single screw hole mouthing in the axial support surface, the single screw hole being radially spaced apart from the radial support surface by a first radial distance, the first radial distance being greater than a second radial distance between the radially outer end of the axial support surface and the single screw hole; and
   a plurality of replaceable milling inserts, each of the plurality of inserts having an elongate basic shape and including two opposite and mutually parallel chip surfaces, two opposite and mutually parallel clearance surfaces and a pair of opposite ends, each of the two chip surfaces transforming into connecting clearance surfaces via a pair of alternately usable cutting edges having identical shape, each of the plurality of milling inserts being fixed in an appurtenant seat by a single screw that is tightened in the single screw hole, wherein the pair of opposite ends are a first end and a second end being separated by a first insert distance forming a total length of the milling insert, each of the plurality of milling inserts including two through holes, which extend continuously between the clearance surfaces, a first through hole being separated from the first end by a second insert distance and a second through hole being separated from the second end by the same second insert distance, the first through hole being separated from the second end by a third insert distance and the second through hole being separated from the first end by the same third insert distance, the third insert distance being greater than the first radial distance between the single screw hole and the radial support surface of the seat while providing a longitudinal eccentricity between the single screw hole and one of the first and second through holes in the respective milling insert, each of the first and second through holes being separated from a respective chip surface by a fourth insert distance that is greater than a transversal distance between the single screw hole and the tangential support surface while providing a transversal eccentricity between one of the first and second through holes and the single screw hole, the longitudinal and transversal eccentricities upon tightening of the single screw applying a clamping force to the milling insert, such that the clamping force resiliently presses the respective milling insert against the radial support surface and against the tangential support surface.

2. A milling tool according to claim 1, wherein the longitudinal eccentricity is at least 0.10 mm.

3. A milling tool according to claim 1, wherein the transversal eccentricity is at least 0.05 mm.

4. A milling tool according to claim 1, wherein the first and second through holes are separated by a mutual distance, each of the milling inserts is included in a kit that includes differently long, equally wide milling inserts, a longer milling insert having the two through holes separated by a first mutual distance and a shorter milling insert having the two through holes separated by a second mutual distance, the first mutual distance being smaller than the second mutual distance, the third insert distance in the longer milling insert and the third insert distance in the shorter milling insert being equal.

5. A milling tool according to claim 4, wherein the second insert distance between the first through hole and the first end of a respective longer or shorter individual milling insert is equal, wherein the second insert distance is smaller than the first and second mutual distance between the two through holes.

6. A milling tool according to claim 1, wherein the two through holes of each individual milling insert have a countersink that receives a screw head, one of the countersinks opening in one of the clearance surfaces and the other one of the countersinks opening in the opposite clearance surface.

7. A milling tool according to claim 6, wherein in each clearance surface of each milling insert, a first hole and a second hole mouth, the first hole having a countersink with a greater mouth in the clearance surface than the second hole.

8. A milling tool according to claim 6, wherein at the chip surface of the milling insert, two diagonally opposite analogously shaped arched part edges are formed.

9. A milling tool according to claim 1, wherein the opposite ends of each milling insert are mutually parallel.

10. A milling tool according to claim 1, wherein the two through holes of each milling insert are shaped so that centre axes thereof are situated in a symmetry plane situated halfway between the chip surfaces of the respective milling insert.

11. A milling tool according to claim 8, wherein at the proximal end of the milling insert, each of the arched part edges is primarily situated on the same side of a neutral plane as the countersink that is situated closest to the proximal end, the neutral plane being situated halfway between the two clearance surfaces.

12. An insert kit for milling tools comprising a plurality of milling inserts, each of the plurality of milling inserts having an elongate basic shape and two opposite and mutually parallel chip surfaces, two opposite and mutually parallel clearance surfaces, a pair of opposite ends and two through holes, the through holes extending continuously between the clearance surfaces, each clearance surface having a single countersink, each one of the two chip surfaces transforming into connecting clearance surfaces via a pair of alternately usable cutting edges having an identical shape, wherein the plurality of milling inserts form two sets of differently long, although equally wide milling inserts, a longer milling insert having the two through holes separated by a first mutual distance and a shorter milling insert having the two through holes separated by a second mutual distance, the first mutual distance being smaller than the second mutual distance, wherein the pair of opposite ends are a first end and a second end being separated by a first longer insert distance and a first shorter insert distance forming a total length of the longer and shorter milling insert respectively, a first through hole of the longer milling insert being separated from the first end of the longer milling insert by a second insert distance and the first through hole is separated from the second end of the longer milling insert by a third insert distance, wherein a first through hole of the shorter milling insert is separated from the first end of the shorter milling insert by a shorter second insert distance, which is a smaller distance than the second insert distance of the longer insert, and the first through hole is separated from the second end of the shorter milling insert by the same third distance as the longer milling insert.

13. An insert kit according to claim 12, wherein the second distance between the first hole and the first end of the individual longer or shorter milling insert is equally large, but smaller than the first mutual and second mutual distance between the two through holes on the longer and shorter milling inserts respectively.

14. An insert kit according to claim 12, wherein each of the two through holes of the individual milling insert include the countersink intended for the receipt of a screw head, one of the countersinks opening in one of the clearance surfaces and the other one in the opposite clearance surface.

15. An insert kit according to claim 14, wherein in said one clearance surface of the individual milling insert in which the first through hole and the second through hole mouth, the first through hole has a countersink with a greater mouth in said one clearance surface than the second through hole.

16. An insert kit according to claim 14, wherein at the chip surface of the individual milling insert two diagonally opposite analogously shaped arched part edges are formed.

17. An insert kit according to claim 12, wherein the first and second ends of the individual milling insert are mutually parallel.

18. An insert kit according to claim 12, wherein the two through holes of the individual milling insert are shaped so that centre axes thereof are situated in a symmetry plane situated halfway between the chip surfaces of the milling insert.

19. An insert kit according to claim 16, wherein at the first end of the individual milling insert, the arched part edge is primarily situated on the same side of a neutral plane as the countersink that is situated closest to the first end, the neutral plane being situated halfway between the two clearance surfaces.

* * * * *